US008698901B2

(12) United States Patent
Hong

(10) Patent No.: US 8,698,901 B2
(45) Date of Patent: Apr. 15, 2014

(54) AUTOMATIC CALIBRATION

(75) Inventor: Wei Hong, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 13/451,005

(22) Filed: Apr. 19, 2012

(65) Prior Publication Data

US 2013/0278779 A1    Oct. 24, 2013

(51) Int. Cl.
*H04N 17/00* (2006.01)
*H04N 17/02* (2006.01)

(52) U.S. Cl.
USPC ............... 348/187; 348/E17.002; 348/840; 348/E5.144

(58) Field of Classification Search
USPC .......... 348/187, E17.002, E13.016, E13.034, 348/E5.082, 738, 745, 807; 345/1.1
See application file for complete search history.

(56) References Cited

U.S. PATENT DOCUMENTS

| | | | |
|---|---|---|---|
| 7,352,360 B2 * | 4/2008 | Jeng ............................. | 345/157 |
| 8,102,332 B2 | 1/2012 | Nelson et al. | |
| 2005/0068466 A1 | 3/2005 | Waters et al. | |
| 2005/0134525 A1 * | 6/2005 | Tanghe et al. .................. | 345/1.1 |
| 2006/0024041 A1 | 2/2006 | Lou et al. | |
| 2008/0100805 A1 * | 5/2008 | Majumder et al. ............. | 353/30 |
| 2009/0153673 A1 | 6/2009 | Chu et al. | |
| 2011/0141011 A1 | 6/2011 | Lashina et al. | |
| 2013/0257748 A1 * | 10/2013 | Ambrus et al. ............... | 345/173 |

FOREIGN PATENT DOCUMENTS

WO    WO 2011/012913    2/2011

OTHER PUBLICATIONS

Yong et al. "Calibration of the Structured Light System Based on Active Projection", IEEE Exp, Proceedings of the 30th Chinese Control Conf, Jul. 22-24, 2011, pp. 4492-4497.
Gilson et al. "An Automated Calibration Method for Non-See-Through Head Mounted Displays", Journal of Neuroscience Methods 199 (2011), pp. 328-335.

* cited by examiner

*Primary Examiner* — Joseph J Nguyen

(57) ABSTRACT

An automatic calibration method for a projector-camera system including a semi-transparent screen is disclosed herein. An image sequence is caused to be captured from the semi-transparent screen and through the semi-transparent screen while a calibration pattern having features is displayed and not displayed in an alternating succession on the semi-transparent screen. A temporal correlation image is created from the image sequence and a discrete binary signal. Peaks are identified in a spatial cross correlation image generated from the temporal correlation image, where a pattern of the identified peaks corresponds to a pattern of the features in the calibration pattern. The peaks are transformed to coordinates of corrected feature points. A comparison of the corrected feature points and a ground truth set of coordinates for the features is used to determine whether the projector-camera system is calibrated.

15 Claims, 5 Drawing Sheets

AUTOMATIC CALIBRATION

BACKGROUND

Remote collaboration or telepresence systems allow users who are in different locations to see and talk to one another, creating the illusion that the participants are in the same room. These systems include technology for the reception and transmission of audio-video signals so that the remotely located participants are able to communicate in real-time or without noticeable delay. Some systems also include on-screen drawing capabilities and content sharing capabilities. The visual aspect of telepresence systems enhances remote communications by allowing the users to perceive one another as well as any shared content.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to automatic calibration. Examples of the method, computer readable medium, and system disclosed herein are used to automatically calibrate a projector-camera system that includes a semi-transparent screen. To achieve accurate interaction between the real-life users of the projector-camera system and images that are portrayed using the projector-camera system, the 2-dimensional coordinates of the projector and camera should be well aligned. Edge detection, corner detection and other conventional calibration methods are generally not suitable for systems including semi-transparent screens, at least in part because the calibration pattern is blended into the captured image, which includes any background that is seen by the camera through the semi-transparent screen. Examples of the method disclosed herein temporally vary a calibration pattern during the capturing of an image sequence so that temporal correlation may be applied on the sequence of captured images. This method enables the calibration pattern to be separated from the image of the background and features to be extracted from the calibration pattern. Robust feature detection enables automatic calibration of the projector-camera system including the semi-transparent screen.

Figure 1:
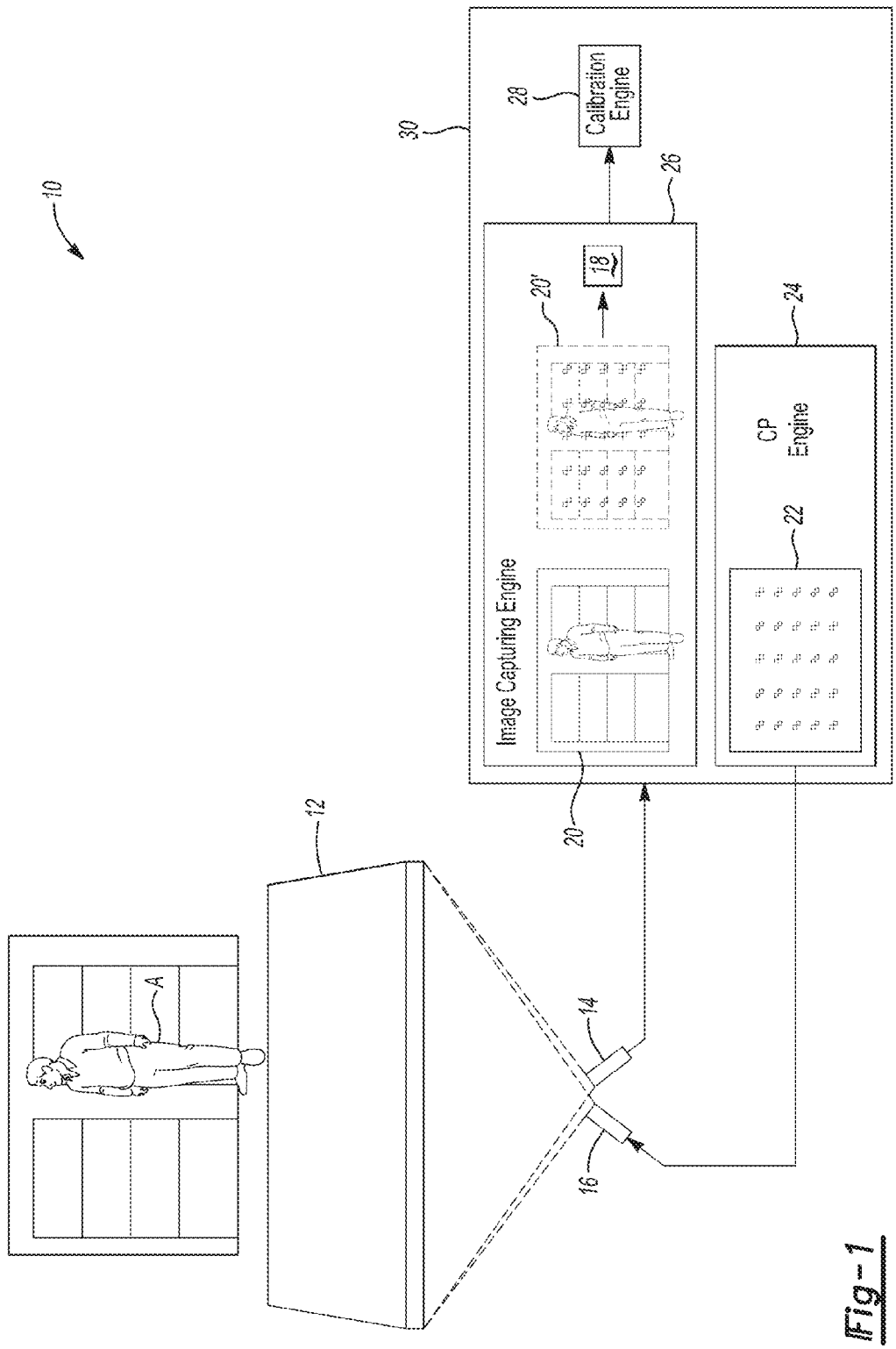
FIG. 1 is a schematic view of an example of a local system of a remote collaboration system, where the local system is operatively connected to an automatic calibration system.

Referring now to FIG. 1, an example of local system 10 of a remote collaboration system is depicted. The local system 10 disclosed herein includes the previously mentioned semi-transparent screen 12. The semi-transparent screen 12 may be any display screen that is capable of having images, calibration patterns, and content projected thereon, and having images captured thereon and therethrough. The local semi-transparent screen 12 may be based upon half-silvered mirrors, variations of the half-silvered mirror (e.g., including a polarizing film sandwiched between the screen and the half mirror), switchable liquid crystal diffusers and other switchable diffusers, holographic projection screens that diffuse light from pre-specified angles and otherwise allow light to pass through, transparent liquid crystal displays, transparent organic light-emitting diodes (OLED), or screens using weave fabrics.

The imaging device 14 is placed behind the semi-transparent screen 12 in order to capture images on and through the semi-transparent screen 12. An example of a suitable imaging device 14 includes a camera that is capable of taking video images (i.e., a series of sequential video frames that capture motion) at any desired frame rate, and/or is capable of taking still images. The imaging device 14 may be synchronized with the projector 16 so that the imaging device 14 captures an image when the projector 16 finishes displaying a full image. Otherwise, the imaging device 14 may capture only part of the image displayed.

The projector 16 is also placed behind the semi-transparent screen 12 in order to project images, calibration patterns, and/or other content on the semi-transparent screen 12. The position of the projector 16 will depend, at least in part, on the type of semi-transparent screen 12 that is utilized. Examples of suitable projectors 16 include DLP projectors, 3LCD projectors, or NEC short throw projectors. As noted above, the imaging device 14 may be synchronized with the projector 16 so that the imaging device 14 captures an image when the projector 16 finishes displaying a full image.

The resolution of the projector 16 and the imaging device 14 may be the same. In an example, the resolution of each of the projector 16 and the imaging device 14 is 1024×768. The resolution of the projector 16 and the imaging device 14 may also be different. In an example, the resolution of the projector 16 is 1024×768, and the resolution of the imaging device 14 is 1920×1080. Higher resolutions (e.g., 1920×1080) may generally be desirable for both the imaging device 14 and the projector 16.

Together, the semi-transparent screen 12, the imaging device 14, and the projector 16 may be part of the local system 10, and may be referred to herein as a projector-imaging device system including a semi-transparent screen.

The local system 10 also includes an automatic calibration system 30, which includes a calibration pattern (CP) engine 24, an image capturing engine 26 and a calibration engine 28. The CP engine 24 may be hardware, programming, or combinations thereof that is capable of generating a calibration pattern 22, and causing the calibration pattern 22 to be displayed and not displayed in alternating succession on the semi-transparent screen 12. The image capturing engine 24 may be hardware, programming, or combinations thereof that is capable of causing an image sequence 18 to be captured from and through the semi-transparent screen 12. The calibration engine 28 may be hardware, programming, or combinations thereof that is capable of creating a temporal correlation image from the image sequence 18 and a discrete binary signal, identifying peaks in a spatial cross correlation image generated from the temporal correlation image, transforming the peaks to coordinates of corrected feature points, and comparing the corrected feature points with a ground truth set of coordinates to determine whether the local system 10 is calibrated. Each of the engines 24, 26, 28 of the automatic calibration system 30 will be discussed further hereinbelow.

Figure 2A:
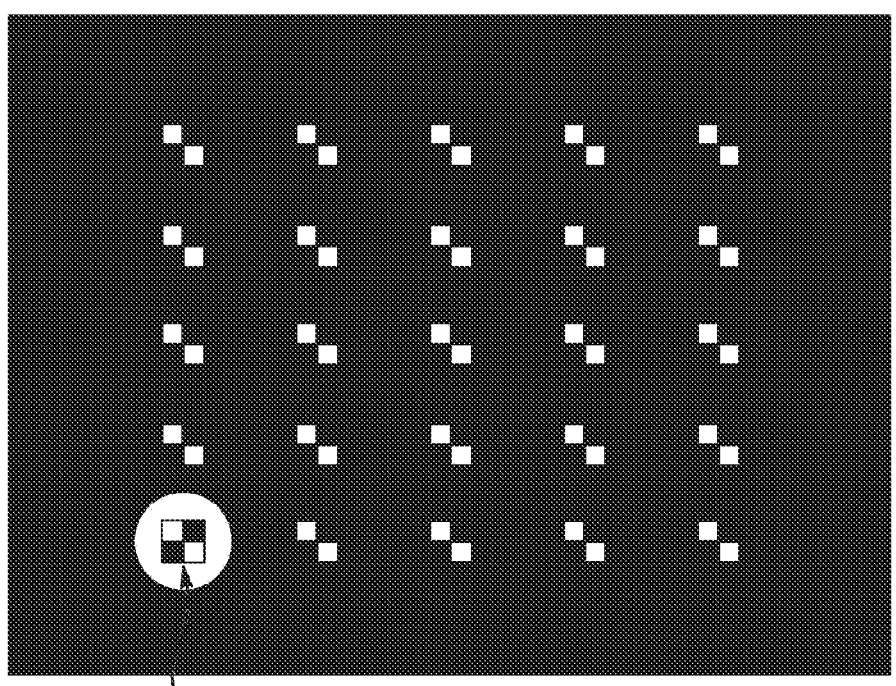
FIG. 2A is an example of a calibration pattern.
Figure 2B:
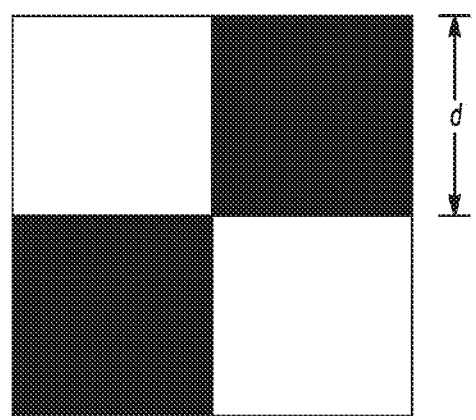
FIG. 2B is an enlarged view of a feature of the calibration pattern of FIG. 2A.

The CP engine 24 is capable of automatically generating the calibration pattern 22. An example of the calibration pattern 22 is shown in FIG. 2A. At the outset, the CP engine 24 selects a feature 32 and an M×N pattern of the features 32. An example of the feature 32 is the 2×2 black-and-white checkerboard shown in FIGS. 2A and 2B. Other examples of the feature 32 include dots, rectangles, crosses, QR codes, or the like. As illustrated in FIG. 2B, the black square of the 2×2 black-and-white checkerboard feature 32 has a side length d. In other words, d is ½ the total side length of the feature 32.

Any M×N pattern of the features 32 may be selected for the calibration pattern 22, so long as M is equal to or less than W/4d, where W is the width of the semi-transparent screen 12 and d is the side length (shown in FIG. 2B), and N is equal to or less than H/4d, where H is the height of the semi-transparent screen 12 and d is the side length of one of features 32. M and N may or may not be equal. As shown in FIG. 2A, the calibration pattern 22 includes a 5×5 pattern of the 2×2 black-and-white checkerboard features 32. In an example, M×N is greater than or equal to 4.

The CP engine 24 evenly distributes the features 32 at $(x_i, y_j)$ where i=1 ... M and j=1 ... N. The minimum separation or distance between the evenly distributed features 32 is equal to the size of the feature 32, or 2d. This minimum separation/distance enables subsequent feature discrimination by a spatial cross correlation image. The minimum separation may be achieved when the maximum M and N are selected. However, in some instances, it may be desirable to have the separation/distance between the features 32 be larger than the size of the features 32 in order to reduce the overall brightness of the calibration pattern 22. Reducing the brightness of the calibration pattern 22 may be desirable to minimize any deleterious effect the brightness of the calibration pattern 22 may have on the automatic gain control of the imaging device 14. As such, it may be desirable to select an M×N pattern where both M and N are less than the maximum possible values. In an example, the separation/distance between the features 32 may range from about 5d to about 10d. It is to be understood that a randomized distribution of the features 32 may not be desirable, at least in part because the features 32 may be less detectable in the calibration pattern 22 and the randomized features cannot subsequently be ordered.

During a calibration mode of the local system 10, the CP engine 24 causes the calibration pattern 22 to be displayed by the projector 16 on the semi-transparent screen 12 in alternating succession. Simultaneously, the image capturing engine 26 causes the imaging device 14 to capture images 20' while the calibration pattern 22 is displayed and to capture images 20 while the calibration pattern 22 is not displayed. The frequency of both the projection of the calibration pattern 12 and the imaging device capture may be set to 8 Hz to allow for enough time to process any data. The frequency may range from about 1 Hz to about 60 Hz, depending, at least in part, on the speed of a computing device that is operatively connected to the imaging device 14 and projector 16. In an example, the calibration pattern 22 is displayed, not displayed, displayed, not displayed, etc. and simultaneously images 20', 20, 20', 20 are respectively captured by the imaging device 14. The plurality of images 20, 20' captured by the imaging device 14 make up the image sequence 18. In an example, the image 20' and image 20 are repeatedly taken K times to obtain a total of 2K images 20', 20 in the image sequence 18.

Multiple images 20' are taken when the calibration pattern 22 is displayed. Since the screen 12 is semi-transparent, these images 20' depict the image of the calibration pattern 22 along with the background that is seen by the imaging device 14 through the semi-transparent screen 12. While the calibration pattern 22 is clearly visible in the schematic representation of image 20', it is to be understood that the calibration pattern may become blended with the background. For example, the contrast of the calibration pattern 22 may be much lower than the contrast of the background due to the semi-transparent property of the screen 12. In some instances, the contrast of the calibration pattern is so much lower than the contrast of the background that the human eye cannot clearly distinguish the calibration pattern from the background in the image 20'.

Multiple images 20 are also taken when the calibration pattern 22 is not displayed on the semi-transparent screen 12. These images 20 depict the background that is seen by the imaging device 14 through the semi-transparent screen 12. From one image 20' that is captured to the next image 20 that is captured, the background is likely to change.

When taking the images 20 and 20', the exposure time of the imaging device 14 may be set from about ¼ of the normal exposure time to about ½ of the normal exposure time. Brighter areas of an image 20 and 20' may become saturated, and reducing the exposure time aids in rendering images 20, 20' that are unsaturated. In an example, the exposure time is set to about ⅓ of the normal exposure time. If an image 20, 20' is captured that has any saturated regions, the exposure time may be adjusted and the image 20, 20' recaptured. In an example, normal exposure time ranges from about 4 ms to about 8 ms, and thus the exposure time of the imaging device 14 may be set anywhere from about 1 ms (¼ of 4 ms) to about 4 ms CA of 8 ms).

The image capturing engine 26 receives the captured images 20 and 20' from the imaging device 14, and transmits the imaging sequence 18 to the calibration engine 28. The calibration engine 28 is capable of representing each of the images 20' (i.e., those images taken when the calibration pattern 22 is displayed) and the images 20 (i.e., those images taken when the calibration pattern 22 is not displayed) by the following formula:

$$I_k(x,y)=B_k(x,y)+P(x,y)S_k$$

where k=1 ... 2K (i.e., the total number of images 20', 20 in the image sequence 18), $B_k(x, y)$ is the background image, P(x, y) is the calibration pattern image, and $S_k$ is the discrete binary signal which equals 1 for all odd k and 0 for all even k. In general, $S_k$ equals 1 when the calibration pattern 22 is displayed, and $S_k$ equals 0 when the calibration image 22 is not displayed.

Figure 3:
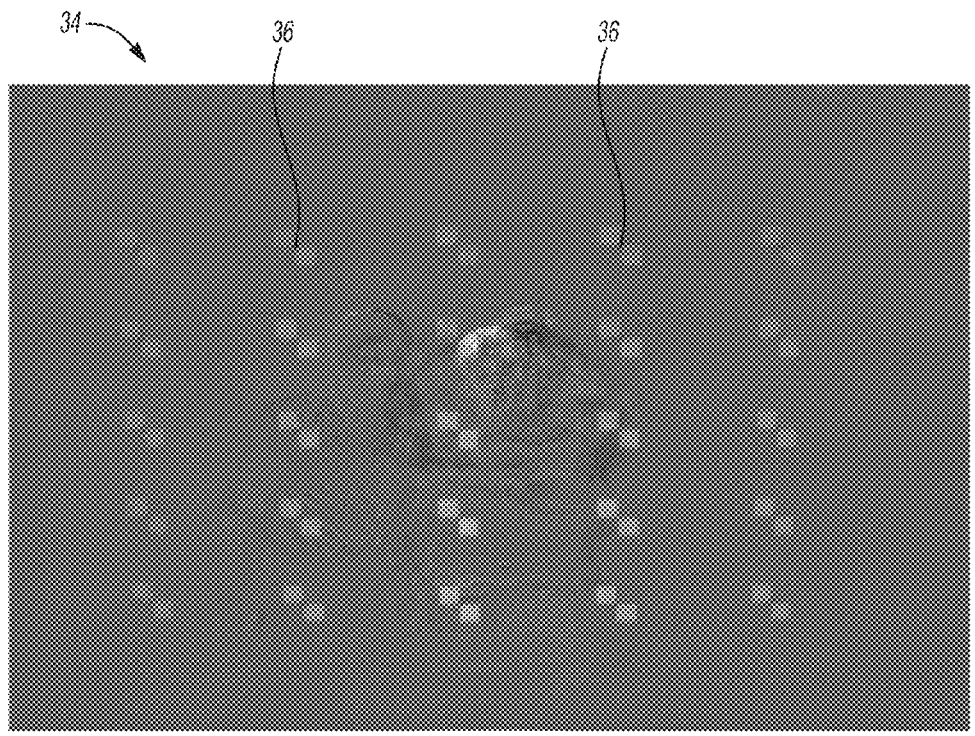
FIG. 3 is an example of a temporal correlation image.

The calibration engine 28, by its hardware and/or programming, is capable of creating a temporal correlation image 34. The temporal correlation image 34 may be created from the image sequence 18 and the binary discrete signals $S_k$ used to represent the images 20 and 20' (i.e., a temporal correlation is generated along k axis between the images, represented by $I_k(x, y)$, in the sequence 18 and the discrete signal $S_k$). FIG. 3 illustrates an example of the temporal correlation image 34 that has been created for the actual image sequence which includes the actual images upon which the illustrations of images 20 and 20' are based. The calibration engine 28 creates the temporal correlation image, C(x, y), as follows:

$$= \sum_{k=1}^{K} (I_{2k-1}(x, y) - I_{2k}(x, y))$$

$$= \sum_{k=1}^{K} ((B_{2k-1}(x, y) + P(x, y)S_{2k-1}) - (B_{2k}(x, y) + P(x, y)S_{2k}))$$

$$= \sum_{k=1}^{K} (B_{2k-1}(x, y) - B_{2k}(x, y)) + KP(x, y)$$

The first term (i.e., $\Sigma_{k=1}^{K}(B_{2k-1}(x, y) - B_{2k}(x, y))$) in the last line of the equation listed above) is the sum of the frame differences between every two consecutive frames (e.g., between the first frame where the first image 20' is captured and the second frame where the first image 20 is captured). The second term (i.e., $\Sigma_{k=1}^{K} KP(x, y)$ in the last line of the equation listed above) is the calibration pattern enhanced K times. For static regions (i.e., where no motion is seen in the backgrounds), the frame differences are all zeros. For regions with motion seen in the backgrounds, the sum of ($B_{2k-1}(x, y) - B_{2k}(x, y)$) may still be small (i.e., much smaller than the second term), at least in part because the frame differences generally do not stay at the same location across multiple frames. As such, the value of KP(x, y) becomes dominant in the equation, and is representative of the temporal correlation image C(x, y). As such, the calibration pattern 32 (P(x, y)) may be enhanced about K times using temporal correlation. This is illustrated in FIG. 3, where the calibration pattern becomes clearly visible in the temporal correlation image 34.

The calibration engine 28, by its hardware and/or programming, is capable of detecting feature center points 36 (i.e., detected centers) in the temporal correlation image 34. The feature center points 36 are shown in FIG. 3, and each feature center point 36 is representative of the center of a respective feature 32. The locations of the feature center points 36 may be detected using spatial cross correlation, and in particular, a spatial cross correlation image (see reference numeral 38 in FIG. 4) generated from the temporal correlation image 34.

In an example, a spatial cross correlation image, R(x, y), may be defined as:

$$R(x, y) = \sum_{u,v \in T} C(x + u, y + u)T(u, v)$$

where T(u, v) is a feature template which is the same as the feature 32 used in the calibration pattern 22. However, this method may be computationally expensive.

Figure 4:
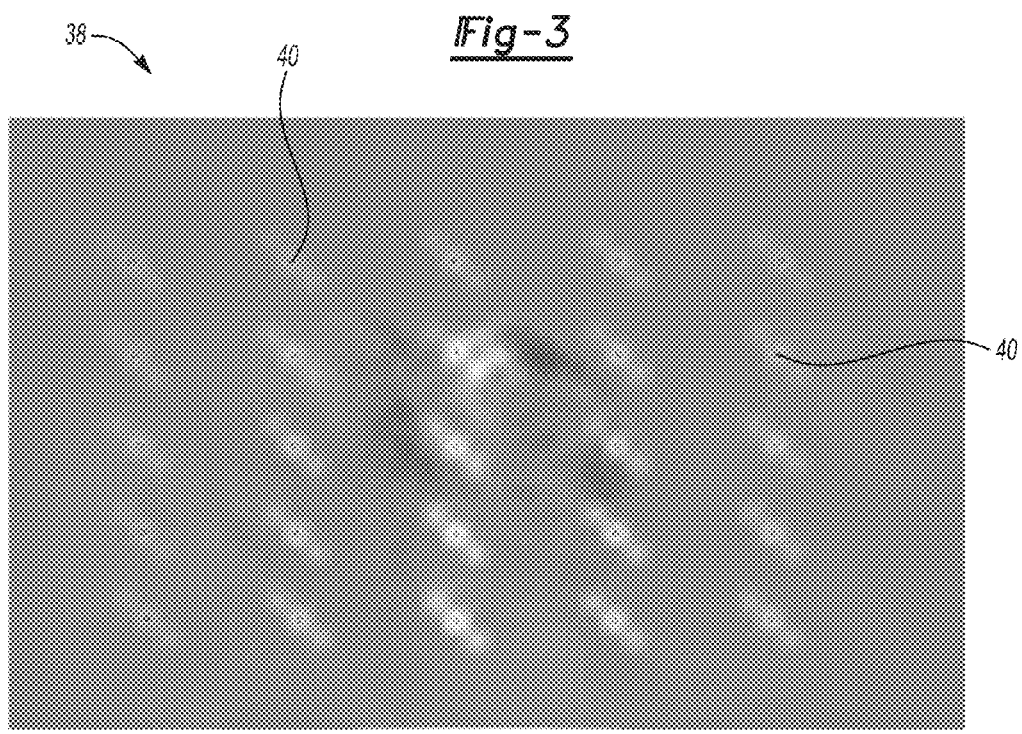
FIG. 4 is a spatial cross correlation image generated from the temporal correlation image shown in FIG. 3.

In another example, the spatial cross correlation image, R(x, y), may be calculated using an integral image G(x, y), of the temporal correlation image, C(x, y). This spatial cross correlation image may be defined as follows:

$$R(x,y) = 2G(x,y) + G(x-d,y-d) + G(x+d,y+d) - G(x-d,y) - G(x,y+d) - G(x,y-d) - G(x+d,y)$$

where d (as noted above) is ½ of the total side length of one of the features 32 in the calibration pattern 22 (i.e., d is the side length of one of the black squares in the feature 32). In FIG. 4, an example of the spatial cross correlation image 38 generated using the integral image of the temporal correlation image 34 shown in FIG. 3 is depicted.

The spatial cross correlation image 38 shown in FIG. 4 has its peaks illustrated with small circles that are labeled as reference numeral 40. The number of features 32 in the original calibration pattern 22 is known (i.e., M×N), and thus the calibration engine 28 is capable of independently extracting M×N of the strongest peaks 40 from the spatial cross correlation image 40. As such, the pattern of the identified peaks 40 corresponds to the pattern of the features 32 in the calibration pattern 22. In an example, the peaks 40 are extracted from the spatial cross correlation image 38 by selecting the highest peak at ($u_i$, $v_i$) for i=1 ... M×N, and then suppressing the selected peak and any peaks in the surrounding region within a distance of D/2, where D is the separation or distance between features 32 in the original calibration pattern 22. Suppression avoids the extraction of multiple peaks 40 around the same feature 32. This process is repeated until all M×N peaks are found. The peaks 40 in the spatial cross correlation image 38 represent the feature center points 36 in the temporal correlation image 34.

As noted above, each of the peaks 40 is associated with respective coordinates ($u_i$, $v_i$) where i=1 ... M×N. The calibration engine 28 is capable of sorting these coordinates, assuming that any rotational misalignment around the imaging device optical axis is minimal. By "minimal", it is meant that the rotation angle is smaller than arctan(D/W), where D is the separation or distance between features 32 in the original calibration pattern 22 and W is the width of the semi-transparent screen 12. The $v_i$ coordinate for each of the peaks 40 is sorted along the y axis. After sorting along the y axis, each of the u coordinates is sorted along the x axis. The number of peaks will still be M×N after sorting is complete. Once sorting is complete, the peaks 40 may each be described as detected feature points ($u_i$, $v_i$), shown as 42 in FIG. 5, which is in a raster scan order that matches the order of the features at ($x_i$, $y_i$) on the calibration pattern 22. This process results in M×N corresponding points between the captured images 20, 20' and the calibration pattern 22.

The calibration engine 28 is configured to assume that the imaging device lens distortion and the projector barrel distortion have been corrected. Since the projection surface and the calibration pattern 22 are planar, the calibration engine 28 may use a transform function (e.g., a homography) to represent the transformation from ($u_i$, $v_i$) to ($x_i$, $y_i$). For example, $$[w_i x_i, w_i y_i, w_i]^T = H[u_i, v_i, 1]^T$$

where $w_i$ is a non-zero scalar for representing ($x_i$, $y_i$) in homogeneous coordinates, T is a matrix transpose operator, and H is a 3×3 homography matrix. In an example, H may be estimated in the least-squares sense when the number of corresponding points is equal to or greater than 4. It is to be understood that if M×N is less than 4, H may not be able to be determined uniquely. Using the estimated H, the calibration engine 28 calculates the coordinates of corrected feature points ($x'_i$, $y'_i$) by:

$$[w' x'_i, w' y'_i, w'_i]^T = H[u_i, v_i, 1]^T$$

Figure 5:
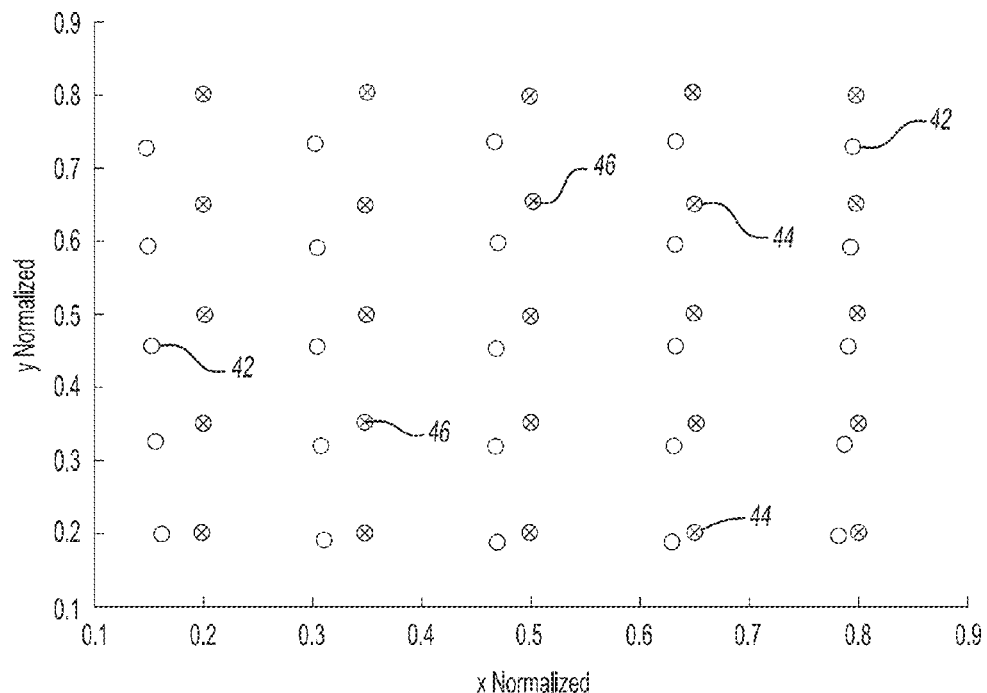
FIG. 5 is a graph illustrating a calibration result from an example of the automatic calibration method disclosed herein.

The corrected feature points are shown at reference numeral 44 in FIG. 5.

The calibration engine 28, by its hardware and/or programming, is also capable of determining whether the local system 10 has been calibrated by comparing the corrected feature points 44 with a ground truth set of coordinates for the features 32. The ground truth set of coordinates 46 is also shown in FIG. 5. A quantitative determination can be made regarding calibration by calculating the root mean square error (RMSE) between each corrected feature point 44 an associated ground truth set of coordinates 46. If the root mean square error (RMSE) between 44 and 46 is larger than an empirically determined threshold, then the calibration engine 28 determines that the calibration has failed. This may occur, for example, if one or more peaks 40 are wrongly detected. In this instance, a user of the local system 10 may restart the calibration process, for example, with a larger number of total images or frames, 2K. However, if the root mean square error (RMSE) between 44 and 46 is equal to or less than the empirically determined threshold, then the calibration engine 28 determines that the calibration has been successful. A notification of either calibration failure or success may be transmitted to a user, for example, by projecting such a message on the semi-transparent screen 12.

As noted throughout this description, FIG. 5 is a graph of the detected feature points 42, the corrected feature points 44 (i.e., the detected feature points 42 corrected by the homography transform H), and the ground truth set of coordinates 46 for the features 32 of the calibration pattern 22. As illustrated in FIG. 5, the method disclosed herein results in very small correction error between the corrected feature points 44 and the ground truth set of coordinates 46. The x and y axes in FIG. 5 are the x and y coordinates normalized by the width and height of the images.

The automatic calibration process described herein may be performed sporadically in order to calibrate the local system 10. The hardware and/or programming of the automatic calibration system 30 may be configured to run, e.g., once a year or at some other set interval.

Figure 6:
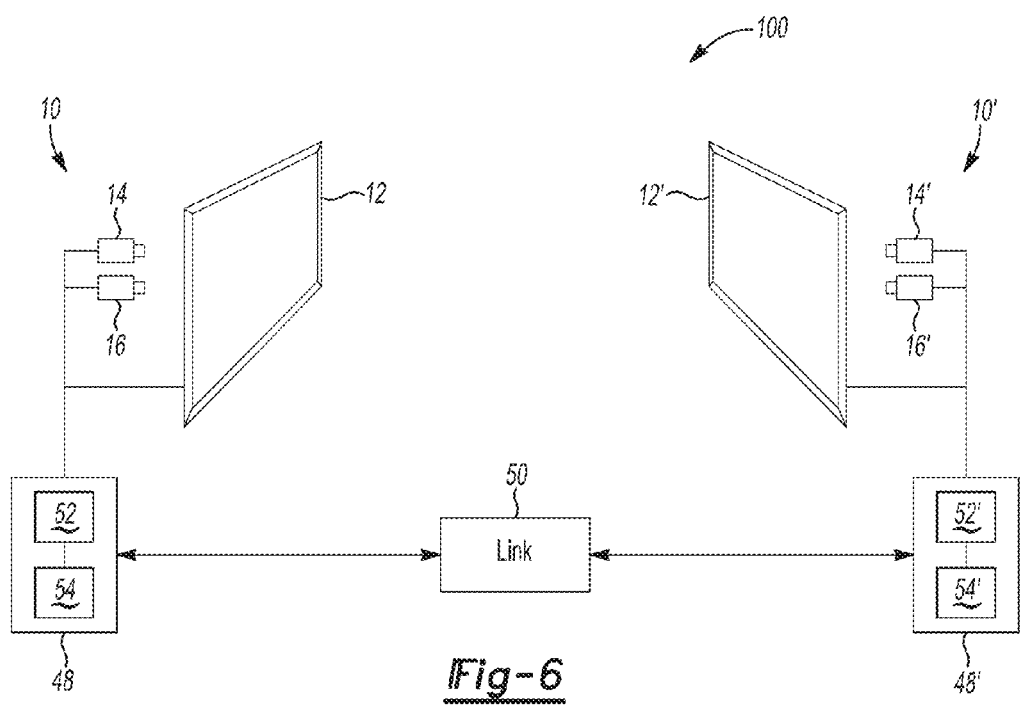
FIG. 6 is a semi-schematic view of an example of a remote collaboration system where an automatic calibration system is part of a local system and a remote system.

In the foregoing discussion, various components have been described as hardware, programming, or combinations thereof. These components may be implemented in a variety of fashions. FIG. 6 illustrates one example of the implementation of these components. In this example, the remote collaboration system 100 includes two local systems 10, 10' (each of which may be considered to be remote from the other). The local systems 10, 10' each include a respective semi-transparent screen 12, 12', a respective imaging device 14, 14', a respective projector 16, 16', and a respective computing device 48, 48' to which the respective components 12, 14, 16 or 12', 14' 16' are operatively connected. The computing devices 48, 48' are connected via a link 50.

The link 50 may be one or more of cable, wireless, fiber optic, or remote connections via a telecommunication link, an infrared link, a radio frequency link, or any other connectors or systems that provide electronic communication. Link 50 may include, at least in part, an intranet, the Internet, or a combination of both. The link 50 may also include intermediate proxies, routers, switches, load balancers, and the like.

The computing devices 48, 48' may be any personal computer, portable computer, content server, a network PC, a personal digital assistant (PDA), a cellular telephone or any other computing device that is capable of performing the functions for receiving input from and/or providing control or driving output to the various devices (e.g., 12, 12', 14, 14', 16, 16', etc.) associated with the respective local system 10, 10' of the remote collaboration system 100.

In the example shown in FIG. 6, the programming may be processor executable instructions stored on non-transitory, tangible memory media 52, 52', and the hardware may include a processor 54, 54' for executing those instructions. In an example, the memory 52, 52' of the respective local system 10, 10' store program instructions that when executed by respective processors 54, 54' implement automatic calibration system 30 of FIG. 1. The memory 52, 52' may be integrated in the same device as the respective processors 54, 54', or they may be separate from, but accessible to, the respective computing device 48, 48' and processor 54, 54'.

In an example, the program instructions may be part of an installation package that can be executed by the respective processors 54, 54' to implement the automatic calibration system 30 of FIG. 1. In these instances, the memory 52, 52' may be a portable medium, such as a compact disc (CD), a digital video disc (DVD), or a flash drive, or the memory 52, 52' may be a memory maintained by a server from which the installation package can be downloaded and installed on the respective computing systems 48, 48'. In another example, the program instructions may be part of an application or applications already installed on the respective computing systems 48, 48'. In this other example, the memory 52, 52' may include integrated memory, such as a hard drive.

Figure 7:
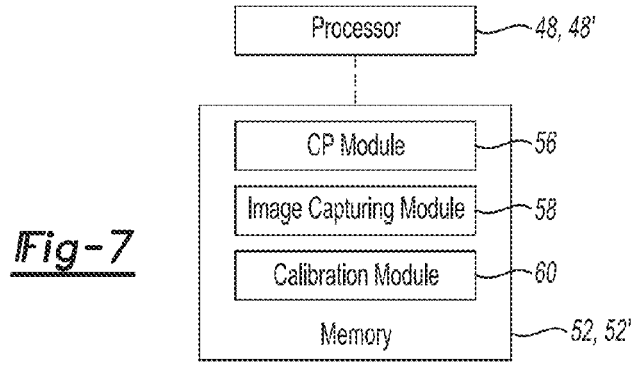
FIG. 7 is a schematic depiction of an example of the automatic calibration system used in FIG. 6.

FIG. 7 illustrates another example of the programming and the hardware that may be used. As shown in FIG. 7, the executable program instructions stored in the memory 52, 52' are depicted as a CP module 56, an image capturing module 58, and a calibration module 60. The CP module 56 represents program instructions that when executed cause the implementation of the CP engine 24 of FIG. 1. Similarly, the image capturing module 58 represents program instructions that when executed cause the implementation of the image capturing engine 26 of FIG. 1; and the calibration module 60 represents program instructions that when executed cause the implementation of the calibration engine 28 of FIG. 1.

Figure 8:
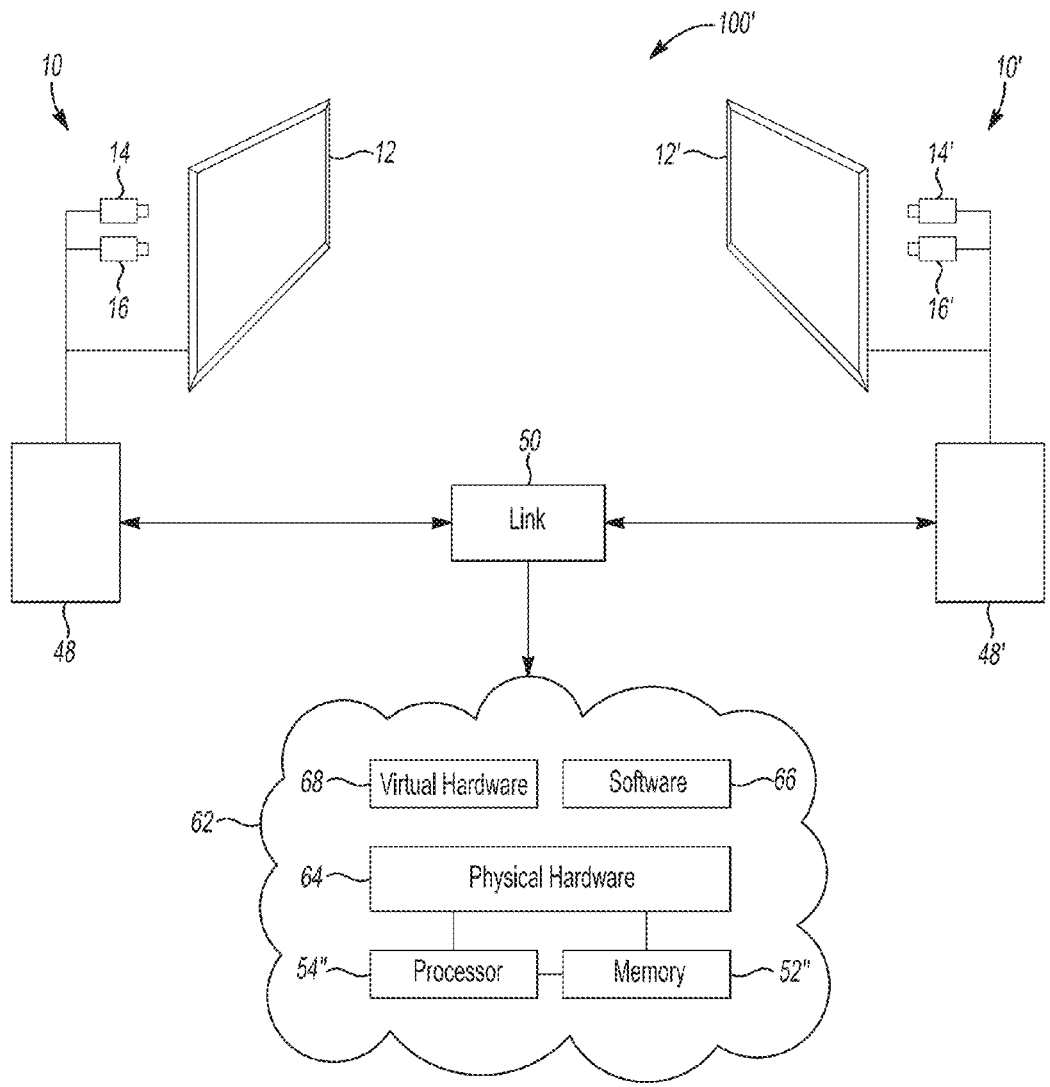
FIG. 8 is a semi-schematic view of an example of a remote collaboration system where an automatic calibration system is part of a cloud computing system.

Referring now to FIG. 8, another example of the remote collaboration system 100' is depicted. In this example, the remote collaboration system 100' includes local systems 10, 10', which as noted above, may be remote to one another. The respective local systems 10, 10' each include the respective semi-transparent screens 12, 12', the respective imaging devices 14, 14', the respective projectors 16, 16', and the respective computing devices 48, 48' to which the respective components 12, 14, 16 or 12', 14' 16' are operatively connected. In this example, however, the computing devices 48, 48' are operatively connected to each other and to a cloud computing system 62 via the link 50.

As used herein, the cloud computing system 62 refers to a computing system including multiple pieces of hardware operatively coupled over a network so that they can perform a specific computing task. The cloud 62 includes a combination of physical hardware 64, software 66, and virtual hardware 68. The cloud computing system 62 is configured to (i) receive requests from the computing devices 48, 48' (or from users using computing devices 48, 48'), and (ii) return request responses. As examples, the cloud computing system 62 may be a private cloud, a public cloud or a hybrid cloud. Further, the cloud 62 may be a combination cloud computing system including a private cloud (or multiple private clouds) and a public cloud (or multiple public clouds).

The physical hardware 62 may include, among others, processors, memory devices, and networking equipment. The virtual hardware 68 is a type of software that is processed by the physical hardware 63 and designed to emulate specific hardware. As an example, virtual hardware 68 may include a virtual machine (VM), i.e., a software implementation of a computer that supports execution of an application like a physical machine. An application, as used herein, refers to a set of specific instructions executable by a computing system for facilitating carrying out a specific task. For example, an application may take the form of a web-based tool providing the local system 10, 10' with a specific functionality, e.g., running the automatic calibration process. It will be understood that an application as used herein is not limited to an automatic calibration application but refers to an application supporting performing a specific task using computing resources such as, among others, remote collaboration applications or data storage applications. Software 66 is a set of instructions and data configured to cause virtual hardware 68 to execute an application. As such, the cloud computing system 62 can render a particular application available to the local system 10, 10' and/or its respective users.

Executing an application in the cloud 46 may involve receiving a number of requests (e.g., requests to run the automatic calibration of the systems 10 and/or 10'), processing the requests according to the particular functionality implemented by the application (e.g., causing the engines and components 14, 14', 16, 16' to perform automatic calibration), and returning request responses (e.g., indicating calibration was successful in the form of a message transmitted to the requesting computing system 48, 48'). For executing the application, the resources (e.g., physical hardware 64, virtual hardware 68, and software 66) of the cloud computing system 62 may be scaled depending on the demands posed on the application. For example, cloud 62 may vary the size of the resources allocated to the application depending on the number of requests, the number of users or local systems 10, 10' interacting with the application, or requirement on the performance of the application (e.g., a maximum response time). While not shown, it is to be understood that the cloud 62 may also include an interface that allows the computing devices 48, 48' to communicate with the components of the cloud 62.

In the example of FIG. 7, the hardware 64 of the cloud computing system 62 may include a processor 54" and a memory 52". The processor 54" may be any processor that is capable of executing program instructions stored in the memory 52" to perform, for example, automatic calibration. The memory 52" may include an operating system and applications, such as an automatic calibration application implemented in C++. The automatic calibration application represents program instructions that, when executed by the processor 54", function as a service that causes implementation of the CP engine 24, the image capturing engine 26, and the calibration engine 28 of FIG. 1. The operating system may be a collection of programs that, when executed by the processor 54", serve as a platform on which the automatic calibration application can run. Examples of operating systems include, for example, various versions of Linux® and Microsoft's Windows®. This type of hardware may also be included in the computing systems 48, 48' shown in FIG. 6.

In the cloud computing system 62 of FIG. 8, the automatic calibration system 30 of FIG. 1 may have the hardware portions implemented as the processor 54" and may have the programming portions implemented as the operating system and applications. In this example then, each of the computing devices 48, 48' may utilize the services of the cloud to achieve automatic calibration of the local systems 10, 10'.

The figures set forth herein aid in depicting various architectures, functionalities, and operations of the examples disclosed herein. Throughout the description, many of the components are defined, at least in part, as programs, programming, or program instructions. Each of these components, portions thereof, or various combinations thereof may represent in whole or in part a module, segment, or portion of code that includes one or more executable instructions to implement any specified logical function(s). Each component or various combinations thereof may represent a circuit or a number of interconnected circuits to implement the specified logical function(s).

The examples disclosed herein may be realized in any non-transitory, tangible computer-readable media for use by or in connection with an instruction execution system (e.g., computing systems 48, 48'), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing systems 48, 48'. Computer readable media may include any one of many physical media such as, for example, electronic, magnetic, optical, electromagnetic, or semiconductor media. More specific examples of suitable computer-readable media include a portable magnetic computer diskette such as floppy diskettes or hard drives, a random access memory (RAM), a read-only memory (ROM), an erasable programmable read-only memory, or a portable CD, DVD, or flash drive.

To further illustrate the present disclosure, an example is given herein. It is to be understood that this example is provided for illustrative purposes and is not to be construed as limiting the scope of the present disclosure.

EXAMPLE

Two camera-projector systems with see-through screens were tested in this example. Each system included a projector and an imaging device, the resolution of each of which was 1024×768. An example of the automatic calibration method disclosed herein (utilizing the integral image of the temporal correlation image to generate the spatial cross correlation image) was implemented on a C++ Windows® platform.

To determine the number of frames (2K) to obtain a reliable calibration, a number of calibrations were performed on each of the systems. The number of frames was gradually increased for subsequent calibrations. It was observed that the root mean square error of the results normally converged after about 40 frames. With this number of frames, the calibration time was under 30 seconds.

The calibration with 40 frames was run 100 times for each of the two systems, with both bright and dark lighting conditions and lots of motion between adjacent frames. In this example, lots of motion included two people moving around and waving their hands when camera images were captured. The average root mean square error was 0.88 pixel for the first system, and the average root mean square error was 0.69 pixel for the second system. These results are much smaller than the width of a finger. As such, it was concluded that the calibration accuracy was good enough for a touch-based user interface of a remote collaboration system.

To check the accuracy of the calibration, the first system was set to loop-back mode so that the image captured by the camera was projected back on the see-through screen. The image illustrated a person pointing his finger at the screen. The person maintained the position of his finger with respect to the screen while the image captured by the camera was projected back on the see-through screen. Prior to performing the calibration method, the positions of the real finger and the finger displayed in the image did not match. Without the calibration method disclosed herein, inaccurate finger pointing resulted, which may reduce the effectiveness of gesturing in remote collaboration. However, after the calibration method disclosed herein was performed one time, the positions of the real finger and the finger displayed in the image matched.

It is to be understood that the ranges provided herein include the stated range and any value or sub-range within the stated range. For example, an exposure time ranging from about ¼ of the normal exposure time to about ½ of the normal exposure time should be interpreted to include not only the explicitly recited limits of ¼ of the normal exposure time to about ½ of the normal exposure time, but also to include individual amounts, such as ⅓ of the normal exposure time, etc., and sub-ranges, such as from ¼ of the normal exposure time to about ⅓ of the normal exposure time, etc. Furthermore, when about is utilized to describe a value, this is meant to encompasses minor variations (up to 0.3) from the stated value (e.g., ±0.3% from the stated time).

While several examples have been described in detail, it will be apparent to those skilled in the art that the disclosed examples may be modified. Therefore, the foregoing description is to be considered non-limiting.

What is claimed is:

1. An automatic calibration method for a projector-imaging device system including a semi-transparent screen, the method comprising:
    causing an image sequence to be captured from the semi-transparent screen and through the semi-transparent screen while a calibration pattern having features is displayed and not displayed in an alternating succession on the semi-transparent screen;
    creating a temporal correlation image from the image sequence and a discrete binary signal;
    identifying peaks in a spatial cross correlation image generated from the temporal correlation image, where a pattern of the identified peaks corresponds to a pattern of the features in the calibration pattern;
    transforming the peaks to coordinates of corrected feature points; and
    determining whether the projector-camera system is calibrated by comparing the corrected feature points with a ground truth set of coordinates for the features.

2. The automatic calibration method as defined in claim 1, further comprising creating the calibration pattern by:
    selecting the pattern of the features as M×N;
    selecting a 2×2 black-and-white checkerboard as each feature; and
    evenly distributing the features at $(x_i, y_j)$ where i=1 . . . M and j=1 . . . N.

3. The automatic calibration method as defined in claim 1 wherein the transforming of the peaks to the coordinates of the corrected feature points includes:
    identifying detected feature points for each of the peaks by sorting v coordinates of each of the peaks along a y axis and then sorting u coordinates of each of the peaks along an x axis; and
    using a transform function, transforming the detected feature points to the corrected feature points.

4. The automatic calibration method as defined in claim 3 wherein the detected feature points are in a raster scan order that matches the pattern of the features in the calibration pattern.

5. The automatic calibration method as defined in claim 3 wherein the transform function is a homography.

6. The automatic calibration method as defined in claim 1 wherein the determining includes one of:
    determining calibration success when a root mean square error between the corrected feature points and the ground truth set of coordinates for the features is equal to or smaller than a threshold value; or
    determining calibration failure when a root mean square error between the corrected feature points and the ground truth set of coordinates for the features is larger than a threshold value.

7. The automatic calibration method as defined in claim 1 wherein the creating of the temporal correlation image from the image sequence and the discrete binary signal is accomplished by:
    i) representing each image in the image sequence as:

$$I_k(x,y) = B_k(x,y) + P(x,y)S_k$$

wherein:
    k=1 . . . 2K;
    2K is a predetermined number of images in the image sequence;
    $B_k(x, y)$ is representative of a background image;
    $P(x, y)$ is representative of a calibration pattern image; and
    $S_k$ is the discrete binary signal which equals 1 for all odd k and 0 for all even k; and
    ii) creating the temporal correlation image, C(x, y), as follows:

$$= \sum_{k=1}^{K} (B_{2k-1}(x, y) - B_{2k}(x, y)) + KP(x, y).$$

8. The automatic calibration method as defined in claim 7, further comprising generating the spatial cross correlation image, R(x, y), using an integral image, G(x, y), of the temporal correlation image, C(x, y), as follows:

$$R(x,y) = 2G(x,y) + G(x-d,y-d) + G(x+d,y+d) - G(x-d,y) - G(x,y+d) - G(x,y-d) - G(x+d,y)$$

wherein d is a side length of one of the features in the calibration pattern.

9. A non-transitory, tangible computer readable medium having instructions embedded thereon that, when executed, implement a method for automatically calibrating a projector-imaging device system including a semi-transparent screen, the method comprising:
    causing an image sequence to be captured from the semi-transparent screen and through the semi-transparent screen while a calibration pattern having features is displayed and not displayed in an alternating succession on the semi-transparent screen;
    creating a temporal correlation image from the image sequence and a discrete binary signal;
    identifying peaks in a spatial cross correlation image generated from the temporal correlation image, where a pattern of the identified peaks corresponds to a pattern of the features in the calibration pattern;
    transforming the peaks to coordinates of corrected feature points; and
    determining whether the projector-camera system is calibrated by comparing the corrected feature points with a ground truth set of coordinates for the features.

10. The non-transitory, tangible computer readable medium as defined in claim 9 wherein:
    the creating of the temporal correlation image from the image sequence and the discrete binary signal is accomplished by:
    i) representing each image and each other image as:

$$I_k(x,y) = B_k(x,y) + P(x,y)S_k$$

wherein:
    k=1 . . . 2K;
    2K is a predetermined number of images in the image sequence;
    $B_k(x, y)$ is representative of a background image;
    $P(x, y)$ is representative of a calibration pattern image; and
    $S_k$ is the discrete binary signal which equals 1 for all odd k and 0 for all even k; and ii) creating the temporal correlation image, C(x, y), as follows:

$$= \sum_{k=1}^{K}(B_{2k-1}(x, y) - B_{2k}(x, y)) + KP(x, y)$$

and the method further comprises generating the spatial cross correlation image, R(x, y), using an integral image, G(x, y), of the temporal correlation image, C(x, y), as follows:

R(x,y)=2G(x,y)+G(x−d,y−d)+G(x+d,y+d)−G(x−d,y)−G(x,y+d)−G(x,y−d)−G(x+d,y)

wherein d is ½ a side length of one of the features in the calibration pattern.

11. The non-transitory, tangible computer readable medium as defined in claim 10 wherein the peaks in the spatial cross correlation image represent detected centers of the features of the calibration pattern in the temporal correlation image, and wherein the transforming of the peaks to the coordinates of the corrected feature points includes:
identifying detected feature points for each of the peaks by sorting v coordinates of each of the peaks along a y axis and then sorting u coordinates of each of the peaks along an x axis; and
using a homography transform function, transforming the detected feature points to the corrected feature points.

12. The non-transitory, tangible computer readable medium as defined in claim 9 wherein the determining includes one of:
determining calibration success when a root mean square error between the corrected feature points and the ground truth set of coordinates for the features is equal to or smaller than a threshold value; or
determining calibration failure when a root mean square error between the corrected feature points and the ground truth set of coordinates for the features is larger than a threshold value.

13. An automatic calibration system for a local system of a remote collaboration system, the automatic calibration system including:
an image capturing engine to:
cause an image sequence to be captured from a semi-transparent screen and through the semi-transparent screen of the local system while a calibration pattern having features is displayed and not displayed in an alternating succession on the semi-transparent screen; and
a calibration engine to:
create a temporal correlation image from the image sequence and a discrete binary signal;
identify peaks in a spatial cross correlation image generated from the temporal correlation image, where a pattern of the identified peaks corresponds to a pattern of the features in the calibration pattern;
transform the peaks to coordinates of corrected feature points; and
compare the corrected feature points with a ground truth set of coordinates for the features to determine whether the local system is calibrated.

14. The automatic calibration system as defined in claim 13 wherein the calibration engine is to further:
create the temporal correlation image from the image sequence and the discrete binary signal by:
i) representing each image and each other image as:

$I_k(x,y)=B_k(x,y)+P(x,y)S_k$ wherein:
k=1 ... 2K;
2K is a predetermined number of images in the image sequence;
$B_k(x, y)$ is representative of a background image;
P(x, y) is representative of a calibration pattern image; and
$S_k$ is the discrete binary signal which equals 1 for all odd k and 0 for all even k; and
ii) creating the temporal correlation image, C(x, y), as follows:

$$= \sum_{k=1}^{K}(B_{2k-1}(x, y) - B_{2k}(x, y)) + KP(x, y)$$

generate the spatial cross correlation image, R(x, y), using an integral image, G(x, y), of the temporal correlation image, C(x, y), as follows:

R(x,y)=2G(x,y)+G(x−d,y−d)+G(x+d,y+d)−G(x−d,y)−G(x,y+d)−G(x,y−d)−G(x+d,y)

wherein d is ½ a side length of one of the features in the calibration pattern.

15. The automatic calibration system as defined in claim 14 wherein the peaks in the spatial cross correlation image represent detected centers of the features of the calibration pattern in the temporal correlation image, and wherein the transformation of the peaks to the coordinates of the corrected feature points is accomplished by:
identifying detected feature points for each of the peaks by sorting y coordinates of each of the peaks along a y axis and then sorting x coordinates of each of the peaks along an x axis; and
using a homography transform function, transforming the detected feature points to the corrected feature points.

\* \* \* \* \*

UNITED STATES PATENT AND TRADEMARK OFFICE
CERTIFICATE OF CORRECTION

PATENT NO. : 8,698,901 B2
APPLICATION NO. : 13/451005
DATED : April 15, 2014
INVENTOR(S) : Wei Hong It is certified that error appears in the above-identified patent and that said Letters Patent is hereby corrected as shown below:

In the Claims

Column 11, line 39, in Claim 2, delete "i=1 M" and insert -- i=1 . . . M --, therefor.

Signed and Sealed this
Seventh Day of October, 2014

Michelle K. Lee
*Deputy Director of the United States Patent and Trademark Office*